(12) United States Patent
Lepp et al.

(10) Patent No.: US 11,272,342 B2
(45) Date of Patent: *Mar. 8, 2022

(54) PEDESTRIAN SAFETY COMMUNICATION SYSTEM AND METHOD

(71) Applicant: BlackBerry Limited, Waterloo (CA)

(72) Inventors: James Randolph Winter Lepp, Ottawa (CA); Stephen John Barrett, Haywards Heath (GB); Ian Christopher Drummond Doig, Roquefort les Pins (FR); Gordon Peter Young, Leamington Spa (GB); Michael Peter Montemurro, Toronto (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/906,010

(22) Filed: Jun. 19, 2020

(65) Prior Publication Data

US 2020/0322770 A1     Oct. 8, 2020

Related U.S. Application Data

(63) Continuation of application No. 15/455,819, filed on Mar. 10, 2017, now Pat. No. 10,893,400.

(51) Int. Cl.
*H04W 4/80* (2018.01)
*G08G 1/16* (2006.01)
(Continued)

(52) U.S. Cl.
CPC .............. *H04W 4/80* (2018.02); *G08G 1/162* (2013.01); *G08G 1/166* (2013.01); *H04W 4/021* (2013.01);
(Continued)

(58) Field of Classification Search
CPC .... G08B 25/016; G08B 27/006; G08G 1/162; G08G 1/166; H04H 20/59; H04L 67/12;
(Continued)

(56) References Cited

U.S. PATENT DOCUMENTS 9,421,909 B2     8/2016   Strickland et al.
2005/0192030 A1  9/2005   Asthma
(Continued)

OTHER PUBLICATIONS

Siddharth Mohan, Rohit Kapoor, Bibhu Mohanty, "Latency in HSPA Data Networks", http://www.qualcomm.com/media/documents/files/qualcomm-research-latency-in-hspa-data-networks.pdf, Jul. 18, 2013.
(Continued)

*Primary Examiner* — Quoc Thai N Vu
(74) *Attorney, Agent, or Firm* — Moffat & Co

(57) ABSTRACT

A method at a power-limited computing station for communicating in an intelligent transport system, the method including operating the computing station in one of a non-critical radio operating state and a safety-critical radio operating state; receiving a trigger at the computing station; determining whether the trigger should cause the computing station to transition a radio operating state; and if the trigger should cause the computing station to transition the radio operating state, changing the radio operating state to the other of the non-critical radio operating state and the safety-critical radio operating state.

23 Claims, 8 Drawing Sheets

(51) Int. Cl.
*H04W 76/28* (2018.01)
*H04W 76/27* (2018.01)
*H04W 4/021* (2018.01)
*H04W 52/02* (2009.01)
*H04L 67/12* (2022.01)

(52) U.S. Cl.
CPC ....... *H04W 52/0235* (2013.01); *H04W 76/27* (2018.02); *H04W 76/28* (2018.02); *H04L 67/12* (2013.01); *Y02D 30/70* (2020.08)

(58) Field of Classification Search
CPC ...... H04L 67/322; H04W 4/021; H04W 4/22; H04W 4/80; H04W 52/0235; H04W 76/27; H04W 76/28; H04W 4/40; H04W 4/90; H04M 1/72536; H04M 2242/04; Y02D 70/00; Y02D 70/10; Y02D 70/14; Y02D 70/142; Y02D 70/144; Y02D 70/146; Y02D 70/164; Y02D 70/166; Y02D 70/20; Y02D 70/22; Y02D 70/24; Y02D 70/26; Y02D 30/70
See application file for complete search history.

(56) References Cited

U.S. PATENT DOCUMENTS

| | | |
|---|---|---|
| 2007/0296575 A1 | 12/2007 | Eisold |
| 2010/0159959 A1 | 6/2010 | Santhanam |
| 2011/0046920 A1 | 2/2011 | Amis |
| 2012/0295579 A1 | 12/2012 | Miyano |
| 2013/0210460 A1 | 8/2013 | Subramanian et al. |
| 2014/0057587 A1 | 2/2014 | Overby |
| 2014/0274184 A1 | 9/2014 | Menzel et al. |
| 2015/0344038 A1 | 12/2015 | Stenneth |
| 2016/0096473 A1 | 4/2016 | Park |
| 2016/0128128 A1 | 5/2016 | Ang |
| 2017/0019777 A1 | 1/2017 | Cole, Jr. |
| 2017/0366947 A1 | 12/2017 | Makhija |
| 2018/0063785 A1* | 3/2018 | Boixadera-Espax ........... H04W 52/028 |

OTHER PUBLICATIONS

QUALCOMM, "Circuit-Switched Fallback", http://www.qualcomm.com/media/documents/files/circuit-switched-fallback-the-first-phase-of-voice-evolution-for-mobile-lte-devices.pdf, Jul. 18, 2013.

Wojtek Borowicz, "What's the batters life of Estimote Beacons? Can I Optimize it?", https://community.estimote.com/hc/en-us/articles/202552866-what-s-the-battery-life-of-estimote-beacons-can-i-optimize-it-, Aug. 3, 2015.

Camp VSC3 Consortium, "US-EU V2V Safety Message Harmonization Progress Updates", https://www.car-2-car.org/fileadmin/user_upload/OEM_Workshop_WOB/Message_set_coordination_results.pdf, Mar. 12, 2012.

International Searching Authority, International Search Report for PCT international application No. PCT/CA2018/050260 dated Apr. 26, 2018.

* cited by examiner

| BSM 220 |
|---|
| Message Type |
| Message Count |
| Vehicle Temp ID |
| Time |
| Latitude |
| Longitude |
| Elevation |
| Position accuracy |
| Transmission and Speed |
| Heading |
| Steering Wheel Angle |
| Acceleration 4 way |
| Brake Status |
| Vehicle Size |
| Event flags (optional) |
| Path History |
| Path Prediction |
| RTCM package (optional) |
| Other vehicle data (optional) |

| CAM 210 |
|---|
| Message ID |
| Station ID |
| GenerationDelta Time |
| Station Type |
| Latitude |
| Longitude |
| Elevation |
| PositionConfidence |
| Speed |
| DriveDirection |
| Heading |
| HeadingConfidence |
| LongitudinalAcceleration |
| LongitudinalAccelerationConf. |
| AccelerationControl |
| Curvature |
| VehicleWidth |
| VehicleLength |
| VehicleLengthConfidence |
| ExteriorLights |
| PathHistory |
| Optional elements |
| LaneCount |
| ... |

FIG. 2

PEDESTRIAN SAFETY COMMUNICATION SYSTEM AND METHOD

FIELD OF THE DISCLOSURE

The present disclosure relates to safety systems and, in particular, relates to safety systems that may include a device having limited power resources.

BACKGROUND

Intelligent transportation systems (ITS) are systems in which a plurality of devices communicate to allow for the transportation system to make better informed decisions with regard to transportation and traffic management, as well as allowing for safer and more coordinated decision making in transportation networks. ITS system components may be provided within vehicles, as part of fixed infrastructure, such as on bridges or at intersections, and for other users of the transportation systems including pedestrians or bicyclists.

ITS system deployment is receiving significant focus in many markets around the world, with radio frequency bands being allocated for the communications. In addition to Vehicle to Vehicle communications for safety-critical and non-critical applications, further enhancements to proposed systems or applications are being developed for Vehicle to Infrastructure and Vehicle to Portable or Person scenarios. This includes systems to benefit vulnerable road users such as pedestrians and cyclists.

In many cases, a computing station within the ITS system must be capable of reacting quickly. In particular, due to vehicle speeds and range of communications, typically a computing station needs to receive and/or respond to communications with a very low latency. However, to achieve low latency communications, battery intensive radio components on the computing stations generally need to be kept in an active mode of operation, which may be an issue for portable devices having limited power resources.

BRIEF DESCRIPTION OF THE DRAWINGS

The present disclosure will be better understood with reference to the drawings, in which:

FIG. 2 is a block diagram providing a mapping between cooperative awareness messages and basic safety messages;

DETAILED DESCRIPTION OF THE DRAWINGS

Figure 1:
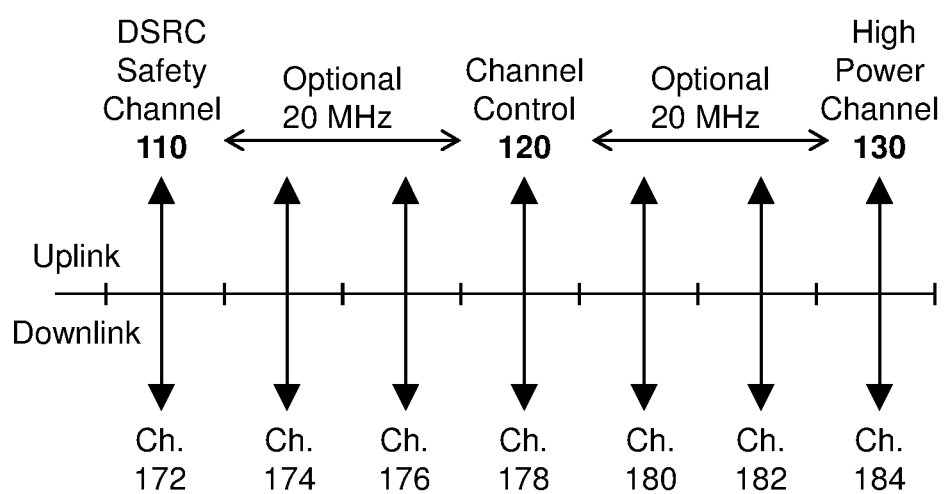
FIG. 1 is block diagram showing channel allocation for a Dedicated Short Range Communications band.

The present disclosure provides a method at a power-limited computing station for communicating in an intelligent transport system, the method comprising: operating the computing station in one of a non-critical radio operating state and a safety-critical radio operating state; receiving a trigger at the computing station; determining whether the trigger should cause the computing station to transition a radio operating state; and if the trigger should cause the computing station to transition the radio operating state, changing the radio operating state to the other of the non-critical radio operating state and the safety-critical radio operating state.

The present disclosure further provides a power-limited computing station for communicating in an intelligent transport system, the computing station comprising: a processor; and a communications subsystem, wherein the computing station is configured to: operate in one of a non-critical radio operating state and a safety-critical radio operating state; receive a trigger at the computing station; determine whether the trigger should cause the computing station to transition a radio operating state; and if the trigger should cause the computing station to transition the radio operating state, change the radio operating state to the other of the non-critical radio operating state and the safety-critical radio operating state.

The present disclosure further provides a computer readable medium containing instruction code, which, when executed by a processor of computing station, allow for communication in an intelligent transport system, the instruction code causing the computing station to: operate in one of a non-critical radio operating state and a safety-critical radio operating state; receive a trigger at the computing station; determine whether the trigger should cause the computing station to transition a radio operating state; and if the trigger should cause the computing station to transition the radio operating state, change the radio operating state to the other of the non-critical radio operating state and the safety-critical radio operating state.

Intelligent transportation systems provide for technology in which software and communication systems are designed to enhance road safety and road traffic efficiency. Such systems include vehicle to/from vehicle (V2V) communications, vehicle to/from infrastructure (V2I) communications, vehicle to/from network (V2N) communications, and vehicle to/from pedestrian or portable (V2P) communications. The communication from a Vehicle to/from any of the above may be generally referred to as V2X. Further, other elements may communicate with each other. Thus systems may include portable to/from infrastructure (P2I) communications, infrastructure to infrastructure (I2I) communications, portable to portable (P2P) communications, among others. As used herein, P2I communications may be referred to as communications between a portable-ITS station and an infrastructure ITS station. V2P communications may be referred to as communications between a portable-ITS station and a vehicle ITS station communications. P2P communications may be referred to as communications between portable-ITS stations. Further, in some cases the communications may be referred to a "safety communications" from a safety application.

Such communications allow the components of the transportation system to communicate with each other. For example, vehicles on a highway may communicate with each other, allowing messages from a vehicle well ahead of a device to indicate it is braking, thereby allowing vehicles to follow each other more closely. Communications may further allow for potential collision detection and allow a vehicle with such a device to take action to avoid a collision, such as by braking or swerving. For example, an active safety system on a vehicle may take input from sensors such as cameras, radar, LIDAR, and V2X, and act on them by steering or braking, overriding or augmenting the actions of the human driver.

In other cases, fixed infrastructure may give an alert to approaching vehicles that they are about to enter a dangerous intersection or alert vehicles to other vehicles or pedestrians approaching the intersection. This alert can include the state of signals in the intersection as well as position of vehicles or pedestrians or hazards in the intersection.

In other cases, a computing station on a bicycle may send alerts to other vehicles or infrastructure to inform the devices or infrastructure components to the presence of the bicycle.

Other examples of ITS communications would be known to those skilled in the art.

Frequency allocations are being proposed in many jurisdictions to promote technology development and adoption, and attempting to ensure interoperability between solutions. In the United States, the Federal Communications Commission (FCC) has allocated the 5850-5925 MHz band for a variety of Dedicated Short Range Communications (DSRC) uses. In Europe, the Electronic Communications Committee (ECC) has allocated 50 MHz in the 5875-5925 MHz band for traffic safety applications, and has further supplemented this allocation with an additional 20 MHz for non-safety applications. The European allocation further includes a statement that "a portable ITS station can be included in a mobile phone or as a standalone device for inclusion of pedestrians and cyclists into the overall traffic safety operations".

Reference is now made to FIG. 1, which shows an example plan of the channel allocation by the FCC. In particular, as seen in FIG. 1, a channel 172 is provided for the DSRC safety channel. Further, a control channel 120 is allocated to channel 178 and a high power channel 130 is allocated to channel 184. Other optional 10 MHz channels include channels 174, 176, 180 and 182.

Various performance requirements are being discussed through international organizations including the Institute for Electrical and Electronics Engineers (IEEE) and the Society for Automotive Engineers (SAE). For example, performance requirements for the IEEE/SAE/DSRC ITS system are defined in SAE J2945/1, 2016-03, and the message dictionary for Basic Safety Messages (BSM) are defined in SAE J2735, 2016-03, the contents of both of which are incorporated herein by reference.

While the above signalling protocols and message sets have been defined to support a wide variety of applications, the system defined in J2945/1 is a safety-related V2V system for specific collision avoidance scenarios.

In Europe, Cooperative Awareness Messages (CAM) are used, rather than the BSM messages. The two systems have differences but many of the core messages are the same or compatible. There is ongoing effort in the industry and standards forums to harmonize the two systems.

For example, reference is now made to FIG. 2, which shows elements within a CAM 210 and BSM 220 message.

For V2P communications, the SAE J2735 Personal Safety Message (PSM) is a DSRC message designed to be sent by a pedestrian, cyclist or road worker, among others. It may contain the following information, as defined in the SAE J2735 2016-03 standard:

basicType Personal DeviceUserType,
secMark DSecond,
msgCnt MsgCount,
id TemporaryID,
position Position3D, —Lat, Long, Elevation
accuracy PositionalAccuracy,
speed Velocity,
heading Heading,
accelSet AccelerationSet4Way OPTIONAL,
pathHistory PathHistory OPTIONAL,
pathPrediction PathPrediction OPTIONAL,
propulsion Propelled Information OPTIONAL,
useState PersonalDeviceUsageState OPTIONAL,
crossRequest PersonalCrossingRequest OPTIONAL,
crossState PersonalCrossingInProgress OPTIONAL,
clusterSize NumberOfParticipantsInCluster OPTIONAL,
clusterRadius PersonalClusterRadius OPTIONAL,
eventResponderType Pu blicSafetyEventResponder-WorkerType OPTIONAL,
activityType PublicSafetyAndRoadWorkerActivity OPTIONAL,
activitySubType PublicSafetyDirectingTrafficSubType OPTIONAL,
assistType PersonalAssistive OPTIONAL,
sizing UserSizeAndBehaviour OPTIONAL,
attachment Attachment OPTIONAL,
attachmentRadius AttachmentRadius OPTIONAL,
animalType AnimalType OPTIONAL,
regional SEQUENCE (SIZE(1 . . . 4)) OF
RegionalExtension {{REG ION.Reg-PersonalSafetyMessage}} OPTIONAL, The messages are typically sent encoded using the ASN.1 or similar encoding in order to provide efficiency. This means the message uses the least number of bits possible to convey its meaning and can be transmitted in a short time duration.

Using the above, vehicles with autonomous driving capabilities or active safety systems may be alerted to the presence of other vehicles with V2V radio messages and can further be alerted to other conditions from Vehicle to Infrastructure messaging. However, such vehicles typically currently are reliant on camera or radar input to detect pedestrians and cyclists. In many cases, pedestrians and cyclists may be in possession of radio equipment that could be used to provide information to a safety system to enhance pedestrian and cyclist detection. Better detection of cyclists and pedestrians by safety systems can reduce collisions and injury.

In particular, if V2P technology is integrated into a V2I/V2V/P2I/P2P system, automobile and roadside unit detection of pedestrians and cyclists can be enhanced, for example, to notify vehicles when pedestrians are approaching a roadway or an intersection, or to alert a pedestrian or cyclists that they are entering an area where they need to be attentive to vehicle traffic.

Accordingly, the present disclosure provides for embodiments for the use of a portable ITS station, which is a power limited device for the transmission or reception of safety messages. The limited power may be due to the portable ITS station relying on battery power or some other similar limited power supply, such as a small generator or dynamo in a bicycle, a fuel cell, solar power, among other options. Such portable ITS station may be in possession of an individual utilizing the traffic infrastructure. For example, such person may be a pedestrian or cyclist or road worker, among other options.

The portable ITS station can include a safety radio, mobile device, smartphone, bicycle computer, smartwatch, device peripheral, or other similar devices. The present disclosure is not limited by any particular portable ITS station. Such portable ITS station is also referred to herein as a power-limited computing station.

A portable ITS station includes a radio which may provide vehicles or other transportation system components with information about location of the pedestrian such that an automated driving system or active safety system within the vehicle can "see" the person. In particular, as used herein, "see" ensures that the vehicle is aware of the pedestrian and cyclists and, may, in some cases, engage to avoid such pedestrian or cyclists if the vehicle and pedestrian or cyclist are on a collision trajectory.

In some embodiments, information about the pedestrian or other vulnerable road user may be relayed, via infrastructure. For example, if a person or cyclist is approaching an intersection and such intersection includes an Infrastructure ITS station, then the portable ITS station on the pedestrian or cyclist may communicate with the infrastructure ITS station and that infrastructure ITS station may then communicate with vehicles approaching such intersection. Other possibilities for such communications would be apparent to those skilled in the art having regard to the present disclosure.

In other embodiments, the portable ITS stations may communicate directly with vehicles in the vicinity.

In further embodiments, a use of the portable ITS station may involve the device receiving messages from vehicles, infrastructure or other radios. Information from these messages may be used to alert the user, for example to make sure the user is aware of the approaching vehicle, that the user is approaching a dangerous intersection, or that another cyclist may be crossing the cycling path, among other scenarios. The alert may comprise any audio, visual or sensory alert. For example, in some embodiments the portable ITS station may provide an audio alert, such as through speakers or headphones on the device. In other embodiments, a video or user interface screen may provide an alert. In other embodiments vibration may be utilized to alert a user. Other signalling techniques could also be used.

Further, in some embodiments, the alert may utilize peripheral devices that are associated with the user. For example, if the user has augmented reality glasses, earphones or other devices connected, for example through short range communications, with the portable ITS station then these peripheral devices may be utilized to transmit the alert to the user.

In some embodiments, the portable ITS device may be capable of both receiving and transmitting data. In other embodiments, the portable ITS device may only be capable of receiving information. In other embodiments, the portable ITS device may be only capable of transmitting information.

The above embodiments use the radio on the portable ITS station as a safety radio. A safety radio typically uses a protocol such as the existing SAE/IEEE DSRC/WAVE, European Telecommunications Standards Institute (ETSI) Cooperative Intelligent Transport Systems (C-ITS), Third Generation Partnership Project (3GPP) V2X, as well as new safety-modes in accordance with the present disclosure for wake up radio (WUR) and Bluetooth low energy (BLE). The use of traditional safety radios in small power-limited devices is problematic because of the required fast response time and low-latency needed for communication duty cycles, and also is problematic based on radio design requirements. Addressing these requirements is expensive from a power consumption perspective and can be problematic for power limited computing stations such as battery-operated devices.

Specifically, the problem may arise because low latency needs in a computing station are typically addressed by keeping the receiver in a receive mode that is on at all times (or close to on at all times). The receiver duty cycle being on at all times, or for the majority of the time, introduces a high power consumption on small, power limited computing stations.

Thus, in accordance with the embodiments described below, integrating V2P/P2I/P2P communications into a portable ITS station safety system needs a communication protocol that can be optimized for minimum latency while providing for lower power consumption.

In accordance with one embodiment of the present disclosure, a power-limited computing station may distinguish between times and places that the computing station radio operation is needed and times and places that the station does not need such low latency. In particular, safety-critical situations may include, but are not limited to, when a pedestrian or cyclist is crossing a busy street at an intersection, crossing a busy street not at an intersection, when a road maintenance worker is at the side of a highway, when a cyclist is travelling on a road with cars, when a pedestrian is walking on rural roads, at an intersection where cycling paths may cross, among other options. Such situations may require a low latency response and therefore require the radio to be on for continuous reception or close to continuous reception.

Non-critical situations may include, but are not limited to, when a user is sitting in a corner office (indoors) near an intersection, when a user is walking down a suburban street that is not very busy, when a user is walking on a sidewalk, when a user is cycling on a particular path, when a barrier separates dedicated cycling lanes from roadways, when the user is cycling on a road that has no cars, when a person is in a vehicle such as a bus or an automobile and thus a portable ITS station may be redundant, among other options.

Figure 3:
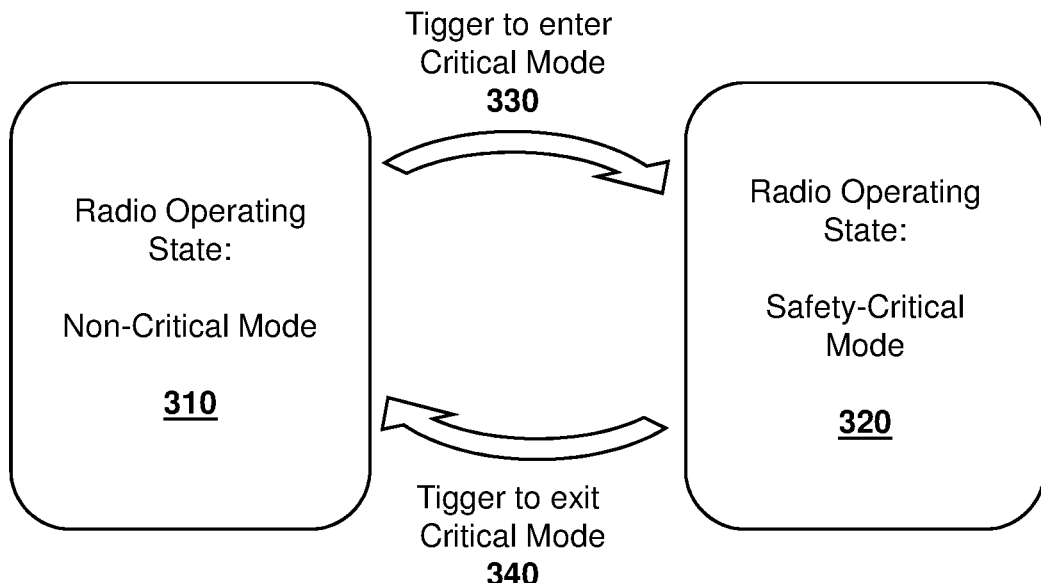
FIG. 3 is a state diagram showing radio states in accordance with embodiments of the present disclosure.

Reference is now made to FIG. 3, which shows a state machine for the portable ITS station. In particular, in accordance with the embodiments described below, in order to save battery power on the portable ITS station, the device may operate in a non-critical mode 310 or a safety-critical mode 320. In particular, when it is determined that the portable ITS station is not in a situation where latency is an issue, then the portable ITS station may operate in the non-critical mode 310. When the portable ITS station is in a scenario where latency becomes an issue, the radio operating state may transition to the safety-critical mode 320 as described below.

In one embodiment, the non-critical mode may have longer sleep cycles and turn the radio on only periodically, thereby saving battery power on the portable ITS device, whereas in the safety-critical mode the radio may either be continuously on or the sleep cycles may be very short, thereby improving latency but reducing power efficiency. In other embodiments, a separate radio may be operated in safety-critical mode, and may be turned off in non-critical mode.

Thus, as seen in FIG. 3, at times when the user of the portable ITS station is not in danger, the safety radio on the portable ITS station will either not be operating or will be operating at a longer duty cycle. Conversely, when the portable ITS station is in a situation where the user may potentially be in danger, the safety radio on the station will operate in safety-critical mode 320, for example by sending periodic CAM, BSM or personal safety messages (PSM).

The safety radio on the portable ITS station may transition from state 310 to state 320 based on a trigger to enter the safety-critical mode, as seen by arrow 330. Conversely, the safety radio may transition from state 320 to state 310 when a trigger to exit the safety-critical mode is received, as shown by arrow 340.

While the examples in the embodiments described herein include a single safety radio, in other embodiments a single device may have a plurality of safety radios. For example, a device may have a Bluetooth™ Low Energy radio and a DSRC radio, where both can act as safety radios. Factors in deciding which radio to use can include energy usage, data throughput requirements, range, user preference, regional regulatory stipulations among other considerations. Alternatively, in some embodiments both safety radios may be used concurrently.

There are various possibilities for when triggers 330 or 340 may be received, how such triggers received, and the criteria associated with the portable ITS station for use in determining whether to act on such triggers. Various example scenarios are described below.

WUR in the DSRC Band

In one embodiment, the trigger to enter the safety-critical mode 330 may be based on a IEEE 802.11ba wakeup radio (WUR).

In particular, pedestrian or other portable ITS stations may turn off the safety radio and use a low-power wakeup radio when in a non-critical situation. Such WUR radio has a receiver that uses much less power than a typical orthogonal divisional multiplexing (OFDM) receiver. Specifically, in one embodiment, a WUR radio in a 10 MHz channel in the 5.9 GHz ITS/DSRC band may be utilized. However other bands for WUR radio may be used in accordance with the embodiments described herein.

WUR signals are on-off-keying (OOK) signals, which are much simpler than OFDM signals and therefore require very basic power detector receivers. Such a receiver is designed so that it can be active 100% of the time with minimal power draw. While the receiver is much more power efficient, the OOK signal is spectrally inefficient meaning it transmits little data for the amount of time it takes to transmit in the medium. The signal may be sent in-band in the "channel 172" DSRC safety band in some embodiments, or it may be transmitted on one of the other channels set aside in the 5.9 GHz band for ITS usage in other embodiments. In still other embodiments, if other bands are defined for ITS usage then such bands may be utilized for WUR radio as well.

Reception of a WUR signal may cause the portable ITS station receiving such signal to enter into a safety-critical mode, where for a time it may operate the safety-critical V2P radio. Thus, referring to FIG. 3, trigger 330 may be the receipt of a WUR signal.

The safety-critical V2P radio can be a safety radio operation that is receive-only, transmit-only or both.

After a time, a portable ITS station may determine that there is no longer a safety-critical situation and therefore switch off the safety radio and return to a state where it only receives messages on the WUR radio. Such determination would represent the trigger 340 from the embodiment of FIG. 3.

In embodiments utilizing WUR radio, access points (APs) mounted at traffic signals at dangerous intersections or crosswalks may broadcast periodic WUR wakeup triggers to signify to the portable ITS stations within proximity to enable their safety radio. In this case, the radio proximity signifies a physical nearness to the hazardous location and thus causes the trigger of the WUR radio wakeup signal. The content of the WUR wakeup trigger frame may also contain location or proximity information above and beyond proximity based on received radio signal strength.

In other embodiments, the infrastructure may only broadcast WUR wakeup triggers at certain times of the day. For example, an intersection may be dangerous during rush hour but may not be dangerous at 3 a.m. In another example, an intersection may be dangerous due to low visibility caused by inclement weather. Other examples of when the WUR wakeup triggers could be broadcast would be apparent to those skilled in the art having regard to the present disclosure.

In one embodiment, the 5.9 GHz WUR signal could be used as a trigger for the portable ITS station to begin operating a DSRC or other safety radio as described above. This provides a solution for situational awareness for the device.

Further, in some cases, the actual safety related signal could be encoded in the 5.9 GHz WUR message. Such encoding is possible due to the low power nature of the WUR which allows for low latency, while maintaining low power consumption. Thus, in some cases the WUR radio may be the safety radio. In other cases, the WUR radio is the trigger to change the operating state of the safety radio.

Figure 4:
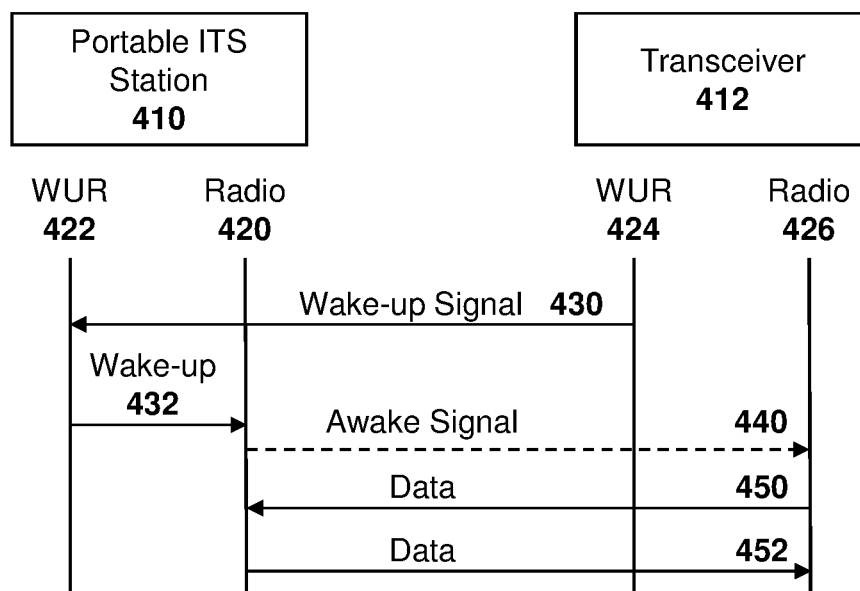
FIG. 4 is a flow diagram showing communications between a portable ITS station having a wakeup radio and a transceiver.

Reference is now made to FIG. 4. In the embodiment of FIG. 4, a portable ITS station 410 may communicate with a transceiver 412. Transceiver 412 may be a stationary transmitter, for example a V2I/P2I transmitter provided at an intersection or other infrastructure location. In other embodiments, transceiver 412 may be moving and may be, for example, a V2P radio, P2P radio, P2I radio, or a V2V radio, among other options.

In order to save battery power, the portable ITS station 410 has its high power radio 420 in a battery saving state and therefore listens to signals using a wakeup radio 422. The battery saving state for radio 420 may include turning radio 420 off or putting radio 420 into a longer sleep cycle. Radio 420 may be any higher power radio including a cellular radio, Wi-Fi radio, DSRC radio, among other options.

Transceiver 412, through a wakeup radio 424 transmits a wakeup signal. Such transmission is shown, for example, as signal 430.

Upon receiving signal 430 at station 410, the wakeup radio 422 may signal to radio 420, for example, in message 432, to wake up. For example, in some embodiments message 432 may be transmitted on an internal bus which allows communication between radio 422 and radio 420 within portable ITS station 410. However, in other embodiments message 432 may use any form of wired or wireless signalling.

Once radio 420 is woken up then it may, optionally, send a signal 440 to radio 426 on transceiver 412 to indicate that the radio 420 has now woken up. In one embodiment, radio 424 and 426 on transceiver 412 may be the same radio. In other embodiments radios 424 and 426 may be different radios.

In the embodiment of FIG. 4, transceiver 412 may then provide information to station 410 in message 450, which may allow station 410 to provide an alert to the user.

In other embodiments, portable ITS station 410 may send signals 452 to radio 426 of transceiver 412 to provide positioning information or other information to allow the transceiver to take actions based on the presence of station 410.

For example, in one embodiment, if transceiver 412 is part of a vehicle, the vehicle may then utilize an avoidance capacity to ensure a collision between the vehicle and the pedestrian carrying portable ITS station 410 is avoided.

In other embodiments, if transceiver 412 is associated with infrastructure, then the transceiver 412 may broadcast the presence of the pedestrian to vehicles in the nearby vicinity. The V2I/P2I communications from transceiver 412 may be performed, in some embodiments, with a radio that is stronger than the radio on station 410, thereby providing additional range.

In various embodiments, radio 420 may be only a transmitter, and may not be capable of receiving signals. In this case, message 450 from FIG. 4 would not form part of the signalling. In other cases, radio 420 may be a receiver only. In this case, messages 440 and 452 would not form part of the signalling.

With regard to the infrastructure required for such wakeup radio trigger, in one embodiment, an ITS radio containing an access point, such as an 802.11 logical node, is capable of transmitting IEEE 802.11ba trigger frames in the ITS DSRC band. Such radio may be located near an intersection, roadside or near any other such location. The access point may periodically broadcast the wakeup radio trigger frame. For example, in one embodiment the wakeup radio trigger frame may be sent on a 10 MHz wide channel 174.

Figure 5:
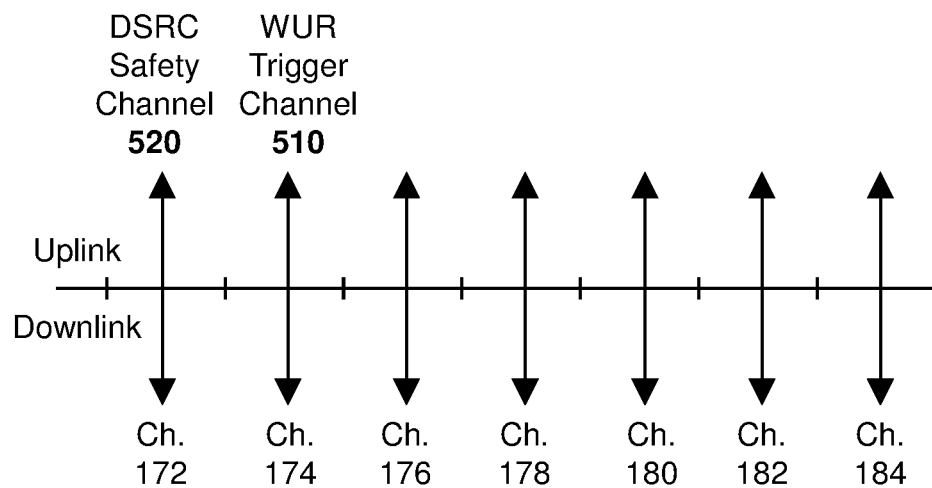
FIG. 5 is block diagram showing channel allocation for a Dedicated Short Range Communications band with wakeup radio.

Reference is now made to FIG. 5, which shows an example channelization of the ITS/DSRC band.

In particular, in the embodiment of FIG. 5, a wakeup radio trigger channel 510 on channel 174 is provided. The DSRC safety channel 520 may further utilize channel 172.

However, the example of FIG. 5 is merely provided for illustration purposes and other configurations for channel utilization are possible.

In some embodiments, infrastructure equipment that transmits such proximity V2P Wake-up triggers may not just do so continuously at all times of the day. The equipment may be networked with a wide area ITS system or local sensors that provide additional information. In this case, the wakeup trigger may only be transmitted when danger is sensed such as low visibility due to inclement weather or a vehicle approaching at a high speed. Other examples of when the wakeup radio trigger is transmitted would be apparent to those skilled in the art.

The wakeup trigger may be transmitted omnidirectional around an intersection in some cases.

In other cases, the wakeup trigger transmission be done with directional antennas designed to transmit linearly in the direction of the road. Such directional antennas may be beamforming, phased array or other known mechanisms to direct signals. For example, the trigger signal may be transmitted towards the east of an intersection to wake-up any devices in that direction, but not to the north, west or south. For roadside infrastructure or similar antenna configurations with capabilities to transmit along one direction of the road and not on the other, this enables the provision of a mechanism to trigger pedestrians which are in the direction of an oncoming vehicle, for example.

With regard to the portable ITS station, the device contains both an IEEE 802.11ba (WUR) receiver as well as the safety radio in one embodiment. Using the example signalling of FIG. 5, the portable ITS station with WUR capabilities is tuned to channel 174 in the 5.9 GHz ITS/DSRC band.

The WUR station may be receive-only or bidirectional. Further, the safety radio may be transmit-only or bidirectional.

When the portable ITS station 410 comes into proximity of an intersection or roadside, in one embodiment the portable ITS station receives and decodes the WUR trigger frame 430. Based on the contents of the WUR trigger frame and possibly in combination with other input, the user device may activate the safety radio. For example, such radio may be activated in order to transmit a CAM or BSM message in message 452. Message 452 may be broadcast to nearby vehicles or infrastructure to inform such stations of the presence of the pedestrian on or near the roadway.

In some embodiments, transceiver 412 may be on a vehicle. In this case, the vehicle may also act as a wakeup trigger transmitter and send wakeup signals which can be received by the devices of pedestrians or cyclists within proximity of the vehicle and thus trigger the pedestrian or cyclist devices to enter the "safety-critical" mode 320. Such a signal could be transmitted omnidirectionally in some cases. In other cases, the signal could be transmitted only in the direction in which the vehicle is heading.

The wakeup radio 422 on the portable ITS station 410 can be set to receive and decode messages from both infrastructure and vehicles at the same time. These messages may then be processed and input into an algorithm to allow the portable ITS station 410 to determine whether or not to transition to the safety state. The determination may depend on whether such signals are from a vehicle or infrastructure, content of such messages, and/or other sensor information on the portable ITS station 410.

Specifically, examples of message contents are provided below. The WUR wakeup trigger message in IEEE 802.11ba is designed to carry a minimum amount of information needed to transition the waking up of the IEEE 802.11 station into an active state. In one case the infrastructure ITS station in a roadside unit (RSU) or vehicular ITS station in an onboard unit (OBU), sending the trigger may only identify itself by a type, for example an intersection, roadway, among other options. In another case, the RSU or OBU sending the trigger may contain specific action such as powering up the safety radio or powering down the safety radio. In still a further embodiment, the message may contain a subset of BSM type data which aids the receiving portable ITS station in deciding whether to enter a safety-critical operating mode, exit the safety-critical operating mode, or do nothing.

For example, reference is now made to Table 1 below, which shows a state transition trigger from an RSU where a small amount of information is provided.

TABLE 1

| Example WUR message from an RSU |
|---|
| Message ID/Message Type |
| Station ID/Temporary ID |
| Latitude |
| Longitude |
| Elevation |

As seen in Table 1, information provided from an RSU may include a message identifier or type and a station identifier or a temporary identifier. The information may further include positioning information such as the longitude, latitude and elevation in the example of Table 1.

If the WUR message is to be used as a state transition trigger from a vehicle mounted OBU in order to wakeup nearby pedestrian devices, a small amount of information may be further provided. This may for example include the trajectory or heading information for the vehicle so that the pedestrian device may use such information to ignore vehicles heading away from the pedestrian device. An example of such a WUR message is shown below with regard to Table 2.

TABLE 2

Example WUR message from an OBU

Message ID/Message Type
Station ID/Temporary ID
Latitude
Longitude
Elevation
Speed
Heading
DriveDirection
VehicleWidth As seen from Table 2 above, the example message includes the information from Table 1, along with speed, heading, drive direction and vehicle width as optional elements.

Further, to use a WUR message to transmit safety information, a subset of the typical V2V message may be used for pedestrian ITS station transmitters. In some cases, this may contain similar or the same contents as the personal safety messages described above. Reference is now made to Table 3 below, which shows an example of WUR message providing safety information.

TABLE 3

Example WUR message having Safety Information

Message ID/Message Type
Station ID/Temporary ID
Latitude
Longitude
Elevation
Speed
Heading
Position
Confidence/Accuracy As seen in Table 3, the information provided includes the information from Table 1, along with speed, heading and position confidence or accuracy.

Other examples of WUR messages that may be sent to a portable ITS device are within the scope of the present disclosure.

Thus, in one embodiment, the trigger to transition into a safety-critical state 320 could be the reception of a WUR wakeup trigger from a vehicle or infrastructure mounted transmitter.

Bluetooth™ Low Energy Communications

In a further embodiment, rather than wake-up radio, Bluetooth™ low energy (BLE) may be used. Bluetooth™ low energy is a frequency hopping radio technology operating in the 2.4 GHz Industrial, Scientific and Medical (ISM) band optimized for low data rate and low power operation relative to standard Wi-Fi.

Bluetooth™ low energy provides a low power means for mobile devices to discover each other, whether they are within another vehicle or on roadside equipment. The majority of mobile devices have a Bluetooth™ radio today. BLE could be used to either trigger a switch between operating modes or used to transmit data.

A BLE device could be capable of listening for BLE transmissions from roadside equipment or moving vehicles. Such device could further be capable of transmitting safety data to roadside equipment or to moving vehicles, similar to what is done today with DSRC communications.

In one embodiment, the BLE communication could be used to trigger a switch in the states, and therefore provide trigger 330 from FIG. 3.

The BLE communications could further trigger the receiving device to enable another technology such as a DSRC radio or other safety mode radio.

The BLE communications could, in one embodiment, communicate similar information to basic safety messages, such as CAM or PSM, or other information to nearby devices.

The BLE communications could further alert the user of the portable ITS station to be aware of a situation.

Further, a simplified BLE solution could be implemented on a wearable device, such as devices having limited resources to support technologies such as DSRC. For example, for a cyclist use-case, a BLE portable ITS station solution could be embedded in a bicycle computer.

Figure 6:
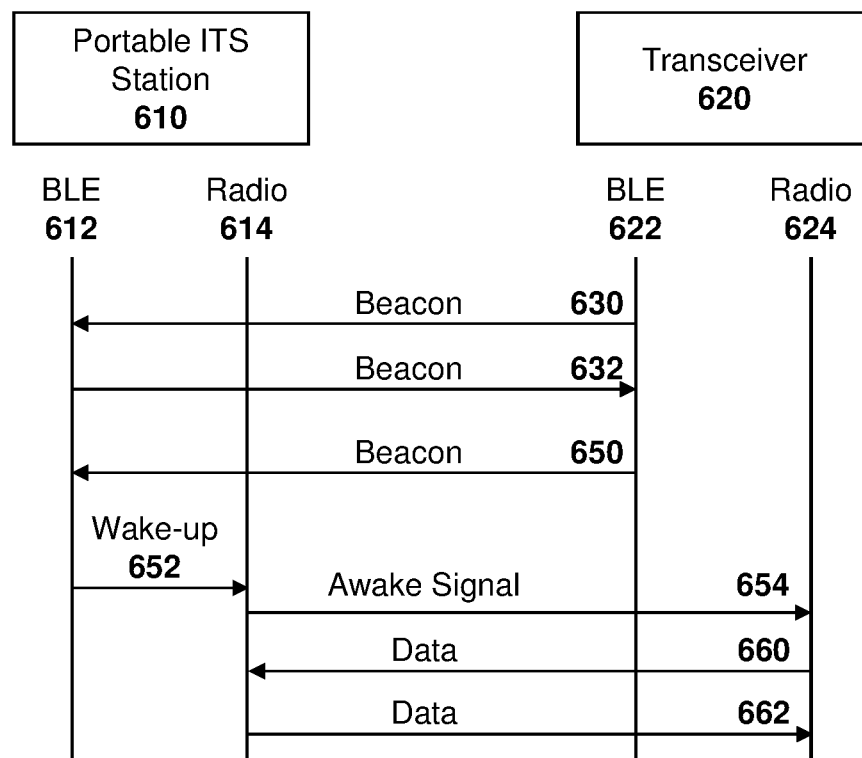
FIG. 6 is flow diagram showing communications between a portable ITS station having a Bluetooth™ Low Energy radio and a transceiver.

Reference is now made to FIG. 6. In the embodiment of FIG. 6, a portable ITS device 610 includes a Bluetooth™ Low Energy radio 612 radio. In some embodiments this may be the only radio on portable ITS station 610.

In other embodiments, portable ITS station 610 includes a second radio 614. The second radio 614 may be any of cellular, Wi-Fi, DSRC or other similar radio technology.

Further, a transceiver 620 includes a BLE radio 622 and may further include a second radio 624, where second radio 624 is capable of communicating with radio 614. Transceiver 620 may be mounted to a stationary element, such as a traffic light or close to an intersection, may be mounted within a vehicle, and/or may be a portable ITS station such as another station associated with pedestrian or cyclist.

In the embodiment of FIG. 6, transceiver 620 transmits a BLE beacon 630 to advertise its presence. For example, beacon 630 may contain information that transceiver 620 is infrastructure equipment and provide a set of associated properties. The properties could include the type of equipment, such as a roadside unit or an intersection unit among other options. Thus, beacon 630 may include some or all of the content of a safety radio frame in some embodiments.

Transceiver 620 may also, in some embodiments, receive beacons 632 from the portable ITS station 610. While portable ITS station 610 in this case must transmit beacons 632, the power efficiency of transmitting beacons 632 is based on both the frequency of transmission and the distance transmitted. The beacon transmission frequency and power may therefore be managed based on power source.

For example, if one transmission is made per second, a station 610 may operate up to 2 years on a small portable battery such as a coin cell. Thus, the power consumption for each of beacons 632 is relatively small, and will not significantly impact the battery life or other power resources of station 610.

Beacons 632 may be used for various purposes. For example, in one embodiment, if multiple coordinated roadside units receive beacons 632, the roadside units may determine the location of portable ITS station 610 through signal reception characteristics.

Further, receipt of beacons 632 may allow the transceiver 620 to alert vehicles using safety radio communications to indicate that pedestrians are present. The alert may be further customized depending on the location and number of portable ITS stations detected, and their location in some embodiments.

Some or all of the content in a safety radio frame may be included in a BLE beacon frame. For example, in some embodiments, beacons 632 may include user location and trajectory.

In the embodiment of FIG. 6, if portable ITS station 610 receives beacons 630, depending on the properties of each beacon, such receipt may trigger transition to a safety-critical mode of operation.

Thus, if the portable ITS station 610 is in motion and receives a BLE beacon from a roadside unit that indicates the position of station 610 in an intersection, the device 610 may trigger a transition to a safety-critical operation mode and thus move from state 310 to 320 from FIG. 3.

In some embodiments, the transition to a safety-critical operation may cause a duty cycle for the BLE radio to reduce the time between waking up, or even transition the BLE radio to a continuous reception mode.

In accordance with one embodiment of the present disclosure, a device, even in a safety-critical mode, may be able to maintain a duty cycle according to the velocity of such device. For example, if a vehicle speed is typically in the range of 10-30 m/s, and a pedestrian walks about 1 m/s and a cyclist moves about 5-9 m/s, such velocity may be utilized to reduce duty cycles for the transmitter. For example, in some cases the higher the speed of the portable ITS station, the shorter the duty cycle may be set.

Specifically, the duty cycle (period between transmissions) of safety messages transmitted by a pedestrian or cyclist device could be continuously evaluated and updated based on information about the pedestrian or cyclist and road conditions. The duty cycle may be a function of the road safety conditions, the pedestrian state, the ability to notify the pedestrian.

The road safety conditions could be a function evaluated based on a vehicle location, roadside unit location, average traffic bearing, average traffic speed, number of vehicles detected, number of roadside units detected, the road conditions such as wet, dry, icy or snow covered, among other factors. Such information may be obtained from vehicles or other roadside units. The information would likely be obtained from the reception of safety information through radio technology.

The pedestrian state is a function that is evaluated based on pedestrian or cyclist location, speed and bearing. This information is typically obtained through information from a device directly such as location applications, sensors, among other options.

The pedestrian notification is a function of the pedestrian state and road safety conditions and is used to determine whether to notify a pedestrian or cyclist of the road safety conditions. This may result in an audible, visual, or vibration alert on a pedestrian device or peripheral, among other options.

Based on the above, the duty cycle may be updated. The duty cycle may be calculated based on pedestrian states and road safety conditions. The duty cycle may increase or decrease depending on the two inputs. Further, while this describes the duty cycle for BLE communications, the duty cycle could equally be changed in other radio technologies, including but not limited to cellular, Wi-Fi, WLAN, WUR, NFC, or WLAN.

Referring again to FIG. 6, in some embodiments, the portable ITS station 610 may decide that it needs to activate a second radio in order to exchange data more rapidly. This is shown, for example, through the receipt of beacon 650, which may contain certain information for the device which would cause the device to trigger the waking of the second radio 614.

Upon receipt of beacon 650, station 610 wakes up the radio, shown by arrow 652. Thereafter, the station 610 may transmit, using a second radio 614, an awake indication 654 to station 620. Subsequently, data may be exchanged between second radio 614 and radio 624, as shown by arrows 660 and 662.

Other examples of communications would be apparent to those skilled in the art having regard to the present disclosure.

The above therefore provides for Bluetooth™ Low Energy communications to trigger a portable ITS station to enter into a safety-critical mode by either adjusting the duty cycle of the BLE communications or by activating a second radio.

BLE communications and/or other factors as described in the embodiments herein may cause the portable ITS station to transition back to the non-critical mode.

Triggers to Enter or Exit a "Safety-Critical" Mode

In accordance with yet a further embodiment of the present disclosure, other triggers may be defined to enter and exit the safety-critical mode.

In accordance with one embodiment, two radio receiver states could be implemented in the same radio hardware, but operating with two different sets of configuration parameters. For example, the non-critical mode could use discontinuous reception and a lengthy period between transmission, while the safety-critical mode has a receiver on continuously or nearly continuously, and transmits more frequently. Also the contents of the transmitted messages may be the same or different in the two different states.

In a further embodiment, two radio operating states could be implemented using two completely independent sets of radio equipment on the same device. For example, in one embodiment the IEEE 802.11ba WUR or a cellular idle paging state could be used for the non-critical mode, while a fully activated safety radio may be used for the safety-critical mode.

Thus, a pedestrian may carry a smartphone device as the portable ITS station. The smartphone contains a number of different radio transceivers, including cellular, wireless local area network (WLAN), Bluetooth™, near field communications (NFC) as well as a safety radio that operates in accordance with the SAE J2945/1 (DSRC) or similar protocol. While the pedestrian is walking down the street, the cellular radio is connected to a network but not currently in a voice call, the Wi-Fi and Bluetooth radios are periodically scanning for network or devices to attach to and the safety radio is not operating.

As the pedestrian walks closer to the busy intersection, when the user is a certain distance from the intersection it receives a proximity trigger transmitted from the nearby roadside infrastructure. The trigger may be a BLE beacon, a WLAN management frame, WUR wakeup trigger frame, among other options. In this case, the pedestrian's device may automatically activate the safety radio and begin sending periodic safety messages, including CAM or BSM messages.

The safety messages may then be received by all vehicles in proximity to the pedestrian and identify the pedestrian's location. Thus, vehicles approaching the intersection are aware of the location of the pedestrian near or in the intersection and are able to render such pedestrians within a local dynamic map.

In case the pedestrian is in the vehicle's path, the vehicle can autonomously steer or brake to avoid the pedestrian. Further, dynamic speed limits may be implemented such that the speed of vehicles in the vicinity of other pedestrians is limited.

In the example above, the proximity trigger is merely meant for illustration purposes. Further, the WUR trigger frame in DSRC band, the Bluetooth low energy, and the proximity trigger are only three examples of triggers that may move the station from the non-critical situation mode of operation to the safety-critical situation mode of operation. Other mechanisms that may be used to trigger a transition from the non-critical mode to safety-critical mode are possible.

Specifically, short range radio triggers may be used to transition the station between modes. Such short range triggers include, but are not limited to, the examples below.

A first short range radio trigger may be the detecting of the proximity to an intersection using a WLAN management or control frame, such as a beacon, Generic Advertisement Service/Access Network Query Protocol (GAS/ANQP) message, Fast Initial Link Setup (FILS) discovery frame, a directional multi-gigabit (DMG) Beacon, a neighbor aware network (NAN) advertisement, or an ANT+ signal.

A second short range radio trigger may be the detecting of a proximity to an intersection using the IEEE 802.11ba WUR, or the WUR in the DSRC band.

A further short range radio trigger may be a Wi-Fi location, for example using IEEE 802.11az.

A further short range radio trigger may be the detecting of the proximity to a vehicle by having the vehicle transmit using its IEEE 802.11ba WUR or WUR in the DSRC band. In some embodiments, detection of proximity to a vehicle can further be refined. For example, limitations may be made to ensure that if a vehicle is moving away from the pedestrian it does not trigger a wakeup. Such determination may be made, for example, by utilizing Doppler, angle of arrival or by using directionality properties of the transmitter antenna.

A further short range radio trigger may include a periodic scan of DSRC band to determine density of vehicles nearby. This may, for example, be used to detect if there are no vehicles on the road.

A further short range radio trigger may be a ProSe or "out of network coverage" discovery, where a pedestrian station discovers a vehicle station in the vicinity and wakes up safety-critical mode.

A further short range radio trigger may include a long-range radio frequency identifier (RFID) with semi-active or active tags used for the trigger. Examples include a 433 MHz ISM, or GHz range ultra-wideband (UWB) trigger.

A further short range radio trigger may include control signals from a low power radio technology such as Bluetooth Low Energy transmissions.

In a further embodiment, triggers may comprise cellular assisted geofences. In particular, cellular assisted geofences may cause a network triggered mode change. One solution may be based on the cellular network monitoring a cellular equipped ITS station location and then triggering a mode change based on the geolocation. This may, for example, be done by paging the ITS station and indicating a need to trigger a safety-critical mode.

In a further geofence trigger, the geolocation triggering may be based on a lookup of a portable device's current location and the making of a comparison to a locally stored database. Using a look up system would allow storage of routes traveled as part of a daily routine. For example, the trip to a user's home and work may be mapped and stored within the device. In this case, the capability to update a portable ITS station's cached database could be automated with different profiles of accessible routes being triggered on a regular basis, using factors such as time of day, detection or notification of traffic congestion, among other factors.

In a further embodiment, a cellular assisted geofence trigger may include a station triggered mode change. In this embodiment, the cellular network can broadcast details of the geofence to the portable ITS station in order that the portable ITS station can use the information in determining whether to trigger the activation of the safety-critical mode. Further, in one embodiment the trigger may not be restricted to the use of geolocation technology or deterministic positioning information, but rather detection and possible reception and decoding of information carried on the cellular broadcast channel would be adequate. For example, cellular broadcast information could convey a trigger indication to simply turn on the safety-critical mode or turn off the safety-critical mode via a "toggle mode" indication. Such information could also be carried using a group paging channel, wherein reception by the device of a paging message for a V2X group could act as a trigger for entering or leaving the mode of operation where the safety radio is activated.

Transmission of the cellular broadcast information may be further enhanced through the use of beamforming or any antenna control mechanisms at the transmitter, which results in the cellular broadcast signal being received in a specific, limited coverage area, by the portable ITS station.

The use of a cellular broadcast mechanism allows multiple portable devices to be informed regarding the need to trigger a safety-critical mode rather than a device specific signalling related to the network detection of individual station positions.

In still further embodiments, in-device sensors may be utilized as triggers. Examples of such in-device sensors are provided below.

In one example, an in-device sensor may utilize a Sensor Hub, which may include a magnetometer and an accelerometer. This, for example, may include a six axis gyroscope among other options.

In-device sensors may further include sensors to detect whether the device is indoors or outdoors. This may include ambient light sensors to detect sunlight vs. light emitting diode (LED), fluorescent or incandescent lighting based on frequency. Further, a temperature difference between a downloaded weather report and room temperature may be made to determine whether the temperature matches an estimated outdoor temperature or whether the measured temperature more closely corresponds with a room temperature. If the device is determined to be indoors then activation of the safety radio may not be triggered. Other options for sensors would be apparent to those skilled in the art having regard to the present disclosure.

A further in-device sensor trigger may be an accelerometer which detects if a person is moving. This may be part of a smartphone or a wearable smart pedometer or watch, for example. If the device is coupled to a bicycle additional sensors are possible to monitor for example wheel speed and turning angle. Such sensor information can be encoded in the V2P radio signals transmitted by the bicycle ITS radio.

A further in-device sensor may be a location detection sensor, such as a global positioning system chipset. The station may then use geofencing, including the use of waypoints or triggers which may either be downloaded or hardcoded to the station. The safety-critical radio would only be activated in the areas, defined by the geofence that are deemed to be of high safety risk.

A further in-device sensor may include a user interface component such as a touchscreen, keyboard keys, buttons, or other similar components. The user interface components allow manual selection by the user in a management interface on the device. Given the number of possibilities when the user may not be directly using the road and yet may still be in the vicinity of other V2X radio users, for example, when the user is on a bus or a pedestrian in a heavily urbanized area, it may be possible, in some embodiments, for the user to disable the functionality of the transition to a safety-critical mode and force the device into a non-critical mode until reset through normal operations. For example, in one embodiment where a user normally commutes to work by bicycle and wants to have the V2P service on her smartphone enabled, in situations where the user chooses to walk to work or take a bus to work, she may be able to disable V2P service on her smartphone. Other examples of in device sensors would be apparent to those skilled in the art having regard to the present disclosure.

Regardless of the trigger, a response of a station to a trigger may be different depending on the type of ITS station. For example, if the ITS station is a pedestrian device it may have different reactions to those devices that are used by cyclists, vehicles such as cars or large trucks, or if the device is stationary such as on a lamp pole. In some embodiments more than one input or trigger may be combined to affect the change in operating mode from a non-critical mode of operation to a safety-critical mode of operation, and vice versa.

Figure 7:
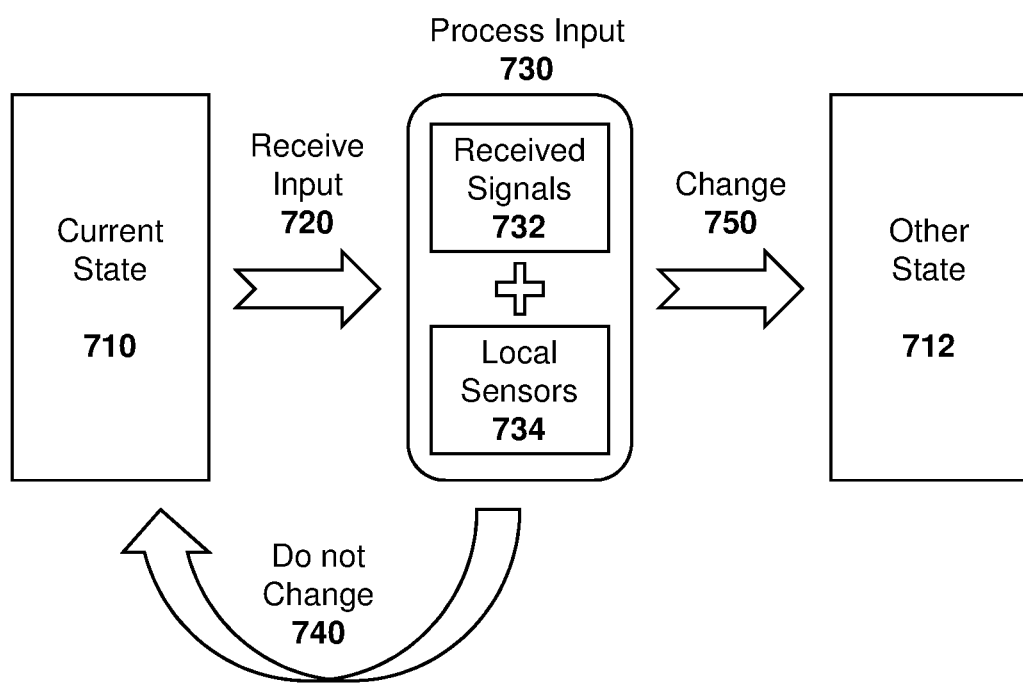
FIG. 7 is block diagram showing transitions between radio states in accordance with embodiments of the present disclosure.

Reference is now made to FIG. 7, which shows a state diagram similar to that of FIG. 3, with the processing of inputs added. In particular, in the embodiment of FIG. 7, the device may be in a current state 710 and may be making decisions of whether to move to the other state 712. For example, current state 710 may be the non-critical mode 310 or the safety-critical mode 320 from FIG. 3. The other state would be the other of the non-critical mode 310 or the safety-critical mode 320 from FIG. 3.

From current state 710, input is received at the station, as shown by arrow 720. An input processing mechanism 730 is provided which can use a combination of one or more of the received signals 732 along with local sensor data 734 to make a determination of whether to remain in the current state, as shown by arrow 740, or to change the state as shown by arrow 750.

Thus, if the current state 710 is the non-critical mode, then various combinations of sensor and input information may be provided to transition to the safety-critical mode. Various non-limiting examples are provided below.

In particular, in one embodiment, the 802.11p radio on a portable ITS station could be activated periodically to perform periodic DSRC reception and determine whether a pedestrian or cyclist is in an environment where there may be other road users. While this is not enough to comply with the SAE J2945/1 latency requirements, it may be enough to detect whether there are vehicles in the vicinity. The detection could be done several ways, including simply detecting a signal power level, decoding the actual message, reading the position and heading and calculating relative distance and trajectory path, among other options. The energy (battery power) used for the above embodiments may vary, and such energy consumption may be one factor in determining which embodiment to use. If vehicles are detected in the vicinity, then the device may transition to the safety-critical mode 320.

In another embodiment, the inputs could include cellular network based geofencing. The cellular network monitors the geolocation of a mobile device or station from the network infrastructure. When the station crosses a geofence into an area where a safety-critical mode needs to be activated then the cellular network may page (or trigger with any message) the station to change modes.

In a further embodiment, cellular network based geolocation of devices in idle mode may be performed. While the device is in idle mode, the cellular network may not know where it is. However, the device can either periodically enter a connected mode to provide location reports to the network or provide information to the network that enables the network to determine its location. Examples of such information includes observed time difference of arrival (OT-DOA) information, or other similar information.

Further, a variety of other information may be taken into account in determining whether entry into safety-critical mode of operation should be triggered. For example, information such as whether there are roadside units in the vicinity, whether the portable ITS station is in motion, among other factors.

Figure 8:
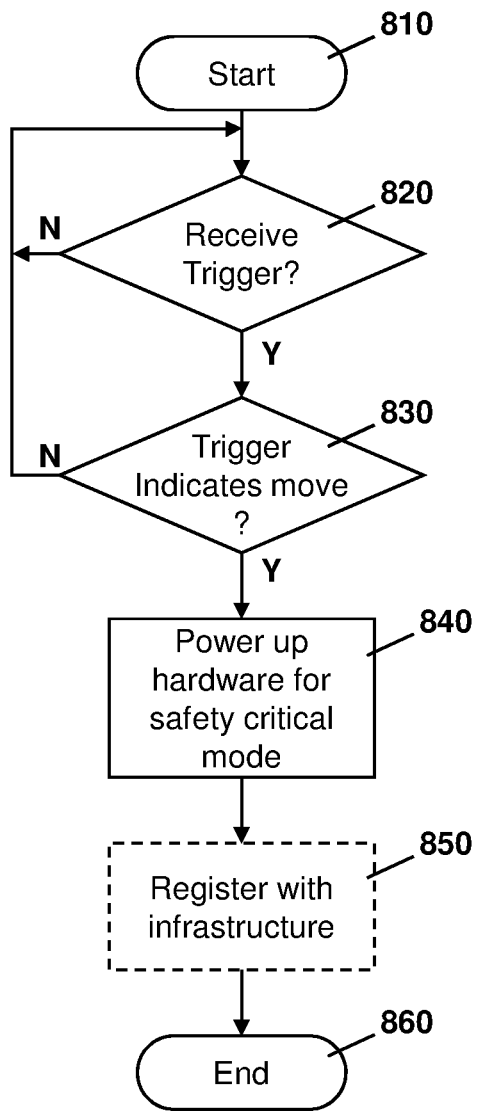
FIG. 8 is a process diagram for transition of a portable ITS station to a safety-critical state.

Thus, switching modes from a non-safety mode to a safety mode may involve a process such as the one illustrated in FIG. 8.

The process of FIG. 8 starts at block 810 and proceeds to block 820 in which a check is made to determine whether a trigger is received as an input. If not, the process continues to loop at block 820 until a trigger is received.

Once a trigger is received, the process then proceeds to block 830 in which the trigger is processed and decision is made concerning the trigger on whether to change states. In particular, the ITS station determines whether a state transition is required.

If, at block 830 it is determined that the device needs to enter into a safety-critical mode, the process proceeds to block 840 in which additional hardware may be powered up to enable the safety-critical mode. Block 840 is optional in some embodiments, for example where a single radio is used for both the non-critical mode and safety-critical modes. In this case, block 840 may optionally be replaced with a block in which the duty cycle is changed for the single radio case.

From block 840 the process optionally proceeds to block 850 in which the portable ITS station registers with infrastructure or network to begin safety-critical mode operations.

From block 830, if the trigger does not indicate that the device needs to move into the safety-critical mode or the device determines that the trigger is not applicable, the process proceeds back to block 820 in which the process waits for a new trigger to be received.

From block 850, the proceeds to block 860 and ends.

Exiting the safety-critical mode can use a similar process, but may shut down hardware in some cases. Specifically, with regard to the exiting from the safety-critical mode, various options are available.

In a first option, the exit may be based on a timer. Specifically, if the device has been in a safety-critical mode of operation for a time >T, where T is either configurable or defined on the device, then the device may exit the safety-critical mode of operation. The timer T could be reset and the time in the safety-critical mode be extended if conditions similar to those that caused the device to enter the safety-critical mode in the first place still exist.

A further option to exit the safety-critical mode may use cellular network based geofencing. Specifically, the cellular network may monitor the geolocation of a station from the network infrastructure. When the station crosses a geofence that takes it out of an area of potential danger, then the cellular network may page the station to trigger the station to change modes. The safety-critical mode may involve the device being in an active state, so accurate network-based geolocation is feasible in one embodiment. Another trigger for exiting safety mode could be the reselection to a cellular base site which does not broadcast or provide group paging information that indicates that the safety radio mode is to be used.

A further method of exiting the safety-critical mode may be based on analysis of received DSRC signals. Examples of such signals include the BSM or CAM, the Signal and Phase Time/Map Data (SPaT/MAP) or a decentralized environmental notification message (DENM). These signals may indicate that there are no vehicles in the vicinity and/or any vehicles that are in the vicinity are on a trajectory that is away from the portable ITS station. The safety-critical mode might involve the device receiving such signals.

In further embodiments, the safety-critical mode may be exited based on a combination of two or more of the above solutions. For example, a timer may be used after a network triggered exit.

In a further embodiment, a combination of a timer and accelerometer may be utilized. Specifically, after an amount of time that the device has been stationary, it may exit the safety mode. In this case, in some embodiments the wake-up trigger may need to be quick. For example, if a user has been sitting at a café near an intersection, the device may need to activate the safety radio mode of operation if the user gets up and starts to cross the road. This may for example be achieved by the accelerometer being configured to provide activation of the safety radio with very low delay when significant movement is detected.

In a further embodiment, a trigger might be a pedestrian walking near a road. If the pedestrian gets into a car/bus/other vehicle, then when the user enters the vehicle the portable ITS station radio essentially hands off responsibility for ensuring the user's safety to the vehicle itself, which performs the V2X signalling on the person's behalf for the duration of the journey in the car. In this case, the device may ignore certain triggers, as described below.

In accordance with FIG. 7, arrow 740 indicates that triggers are ignored in some situations. For example, a trigger may be ignored based on detection or awareness of vehicles in a different plane. Thus, if vehicles are on top of a bridge that the user is below, or if the user is above a tunnel which carries vehicle traffic, then the user being in a different plane allows the user to avoid changing the states based on a trigger for those vehicles. In this case, the plane could be determined based on GPS or altimeter in some embodiments.

Further, if the user is seated in a car or on a bus and the car or bus is on the road, then it may not be desirable to enter the safety-critical mode in some embodiments. The detection that the device is in a vehicle could be done through a variety of means, including sensing or interacting with the vehicle's own V2X communication radio, using near field communications within the vehicle, device pairing with the vehicle, registering a speed that is beyond that possible for pedestrian and cyclists, among other options. For example, the device could determine that the V2X transmissions are advertised as coming from a car or bus at speed and observing that there is no relative change in the position of the device relative to the location being advertised by the V2X messages. This may then signal that the device is within that vehicle. In other embodiments, the near-field radio communication may be in the dashboard or door mounted RFID. Further, device pairing for Bluetooth, Wi-Fi or Wi-Fi Direct with the vehicle infotainment system could trigger the fact that the device is inside the vehicle.

In still further embodiments, triggers may be ignored if thresholds for safety-critical operation are not met. Such thresholds may be adjusted based on location, time of day or weather. For instance, the thresholds could be adjusted for night versus day.

Further, triggers may be ignored based on motion detection within a defined speed range. Thus, if the user is stationary then the portable ITS station may ignore triggers that would normally activate the safety-critical operating mode. Triggers may also be ignored if the received wake up signal has a lower power than a received signal strength indicator (RSSI) threshold.

For example, in one embodiment, a pedestrian device may be stationary for a long time. This may be determined by any combination of sensor data including accelerometer history, GPS signalling, cellular/WLAN signal strengths being unchanged over a period of time, among other options. If there is confidence that the device is not moving, the device may ignore triggers such as WUR or BLE that would normally cause the device to enter the safety state. However, in some embodiments, if other sensor data from the accelerometer indicates that a sudden massive impact preceded the device being stationary, this may in fact trigger the device to enter or stay in a safety-critical mode due to an accident.

In another embodiment, problem areas may be defined as situations where the pedestrian device is receiving a very large number of signals due to a very congested radio environment. In this case, it may filter out and not process signals lower than a certain RSSI threshold, essentially ignoring the input from devices and objects located further away.

Thus, based on the above, the device may have a plurality of modes, where some modes have higher power usage than others but may have lower latency. The device utilizes triggers in determining which state the device should be in to respond appropriately to the various environmental situations.

Enabling V2P communications to provide pedestrian safety when and where it is needed while allowing portable ITS stations to save power is therefore provided in the above disclosure. This allows for implementation of pedestrian safety radio technology on smaller and more user friendly form factors such as mobile phones and wearables.

The modules and devices, including the power limited computing stations, portable ITS stations and access points and transceivers, described above may be any computing device or network node. Such computing device or network node may include any type of electronic device, including but not limited to, mobile devices such as smartphones or cellular telephones. Examples can further include fixed or mobile devices, such as internet of things devices, endpoints, home automation devices, medical equipment in hospital or home environments, inventory tracking devices, environmental monitoring devices, energy management devices, infrastructure management devices, vehicles or devices for vehicles, fixed electronic devices, among others. Vehicles includes motor vehicles (e.g., automobiles, cars, trucks, buses, motorcycles, etc.), aircraft (e.g., airplanes, unmanned aerial vehicles, unmanned aircraft systems, drones, helicopters, etc.), spacecraft (e.g., spaceplanes, space shuttles, space capsules, space stations, satellites, etc.), watercraft (e.g., ships, boats, hovercraft, submarines, etc.), railed vehicles (e.g., trains and trams, etc.), and other types of vehicles including any combinations of any of the foregoing, whether currently existing or after arising.

Figure 9:
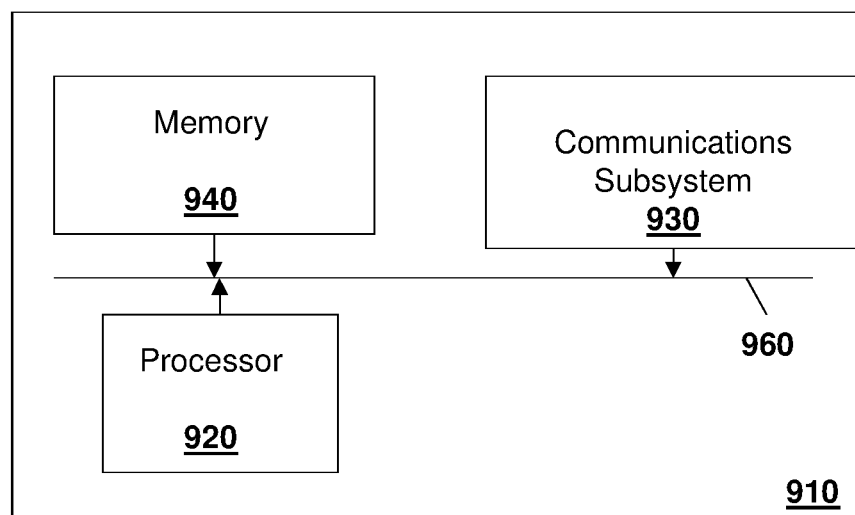
FIG. 9 is a block diagram of a simplified electronic device capable of being used with the methods and systems herein according to one embodiment.

One simplified diagram of a computing device is shown with regard to FIG. 9.

In FIG. 9, device 910 includes a processor 920 and a communications subsystem 930, where the processor 920 and communications subsystem 930 cooperate to perform the methods of the embodiments described above. Communications subsystem 920 may, in some embodiments, comprise multiple subsystems, for example for different radio technologies.

Processor 920 is configured to execute programmable logic, which may be stored, along with data, on device 910, and shown in the example of FIG. 9 as memory 940. Memory 940 can be any tangible, non-transitory computer readable storage medium. The computer readable storage medium may be a tangible or in transitory/non-transitory medium such as optical (e.g., CD, DVD, etc.), magnetic (e.g., tape), flash drive, hard drive, or other memory known in the art.

Alternatively, or in addition to memory 940, device 910 may access data or programmable logic from an external storage medium, for example through communications subsystem 930.

Communications subsystem 930 allows device 910 to communicate with other devices or network elements. Communications subsystem 930 allows any of the communications types described above, including cellular, Bluetooth™, Wi-Fi, WLAN, DSRC, NFC, WUR, among other options.

Communications between the various elements of device 910 may be through an internal bus 960 in one embodiment. However, other forms of communication are possible.

Further, if any of computing stations 410 or 610 or transceivers 412 or 620 are mobile devices, one example device is described below with regard to FIG. 10.

Mobile device 1000 may comprise a two-way wireless communication device having voice or data communication capabilities or both. Mobile device 1000 generally has the capability to communicate with other computer systems on the Internet. Depending on the exact functionality provided, the mobile device may be referred to as a data messaging device, a two-way pager, a wireless e-mail device, a cellular telephone with data messaging capabilities, a wireless Internet appliance, a wireless device, a user equipment, or a data communication device, as examples.

Where mobile device 1000 is enabled for two-way communication, it may incorporate a communication subsystem 1011, including a receiver 1012 and a transmitter 1014, as well as associated components such as one or more antenna elements 1016 and 1018, local oscillators (LOs) 1013, and a processing module such as a digital signal processor (DSP) 1020. As will be apparent to those skilled in the field of communications, the particular design of the communication subsystem 1011 will be dependent upon the communication network in which the device is intended to operate.

Network access requirements will also vary depending upon the type of network 1019. In some networks network access is associated with a subscriber or user of mobile device 1000. A mobile device may require a removable user identity module (RUIM) or a subscriber identity module (SIM) card in order to operate on a network. The SIM/RUIM interface 1044 is normally similar to a card-slot into which a SIM/RUIM card can be inserted and ejected. The SIM/RUIM card can have memory and hold many key configurations 1051, and other information 1053 such as identification, and subscriber related information. Without a SIM card, the mobile device may still be capable of limited functionality, including placing an emergency call.

When required network registration or activation procedures have been completed, mobile device 1000 may send and receive communication signals over the network 1019. As illustrated in FIG. 10, network 1019 can include multiple base stations communicating with the mobile device.

Signals received by antenna 1016 through communication network 1019 are input to receiver 1012, which may perform such common receiver functions as signal amplification, frequency down conversion, filtering, channel selection and the like. Analog to digital (A/D) conversion of a received signal allows more complex communication functions such as demodulation and decoding to be performed in the DSP 1020. In a similar manner, signals to be transmitted are processed, including modulation and encoding for example, by DSP 1020 and input to transmitter 1014 for digital to analog (D/A) conversion, frequency up conversion, filtering, amplification and transmission over the communication network 1019 via antenna 1018. DSP 1020 not only processes communication signals, but also provides for receiver and transmitter control. For example, the gains applied to communication signals in receiver 1012 and transmitter 1014 may be adaptively controlled through automatic gain control algorithms implemented in DSP 1020.

Mobile device 1000 generally includes a processor 1038 which controls the overall operation of the device. Communication functions, including data and voice communications, are performed through communication subsystem 1011. Processor 1038 also interacts with further device subsystems such as the display 1022, flash memory 1024, random access memory (RAM) 1026, auxiliary input/output (I/O) subsystems 1028, serial port 1030, one or more keyboards or keypads 1032, speaker 1034, microphone 1036, other communication subsystem 1040 such as a short-range communications subsystem or DSRC subsystem, and any other device subsystems generally designated as 1042. Serial port 1030 could include a USB port or other port known to those in the art.

Figure 10:
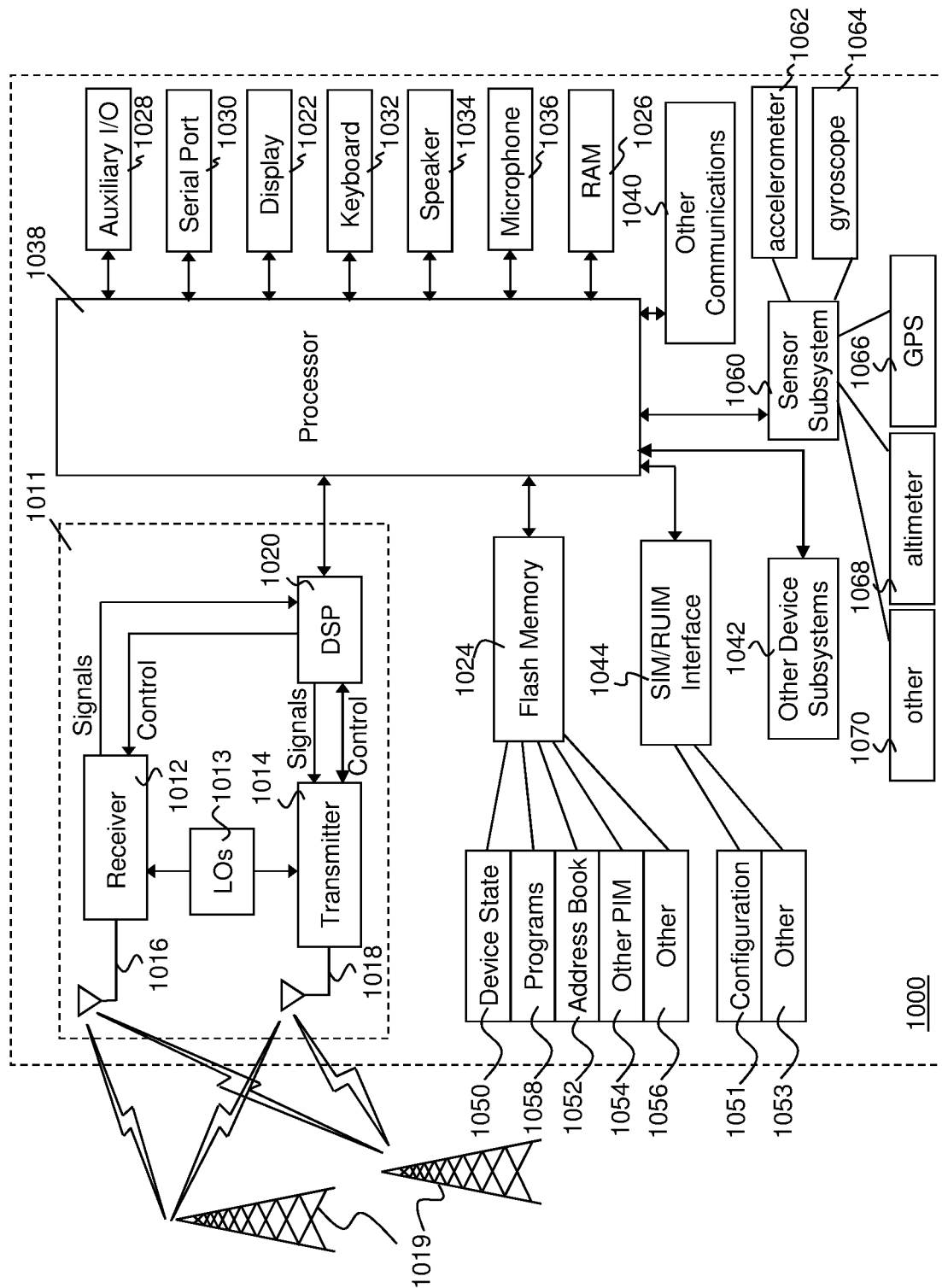
FIG. 10 is a block diagram of a mobile device according to one embodiment.

Some of the subsystems shown in FIG. 10 perform communication-related functions, whereas other subsystems may provide "resident" or on-device functions. Notably, some subsystems, such as keyboard 1032 and display 1022, for example, may be used for both communication-related functions, such as entering a text message for transmission over a communication network, and device-resident functions such as a calculator or task list.

Operating system software used by the processor 1038 may be stored in a persistent store such as flash memory 1024, which may instead be a read-only memory (ROM) or similar storage element (not shown). Those skilled in the art will appreciate that the operating system, specific device applications, or parts thereof, may be temporarily loaded into a volatile memory such as RAM 1026. Received communication signals may also be stored in RAM 1026.

As shown, flash memory 1024 can be segregated into different areas for both computer programs 1058 and program data storage 1050, 1052, 1054 and 1056. These different storage types indicate that each program can allocate a portion of flash memory 1024 for their own data storage requirements. Processor 1038, in addition to its operating system functions, may enable execution of software applications on the mobile device. A predetermined set of applications that control basic operations, including at least data and voice communication applications for example, will normally be installed on mobile device 1000 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the mobile device such as, but not limited to, e-mail, messages, calendar events, voice mails, appointments, and task items. Further applications, including productivity applications, social media applications, games, among others, may also be loaded onto the mobile device 1000 through the network 1019, an auxiliary I/O subsystem 1028, serial port 1030, short-range communications subsystem 1040 or any other suitable subsystem 1042, and installed by a user in the RAM 1026 or a non-volatile store (not shown) for execution by the processor 1038. Such flexibility in application installation increases the functionality of the device and may provide enhanced on-device functions, communication-related functions, or both. A further software application with higher privilege level includes a device administrator module as described above.

In a data communication mode, a received signal such as a text message or web page download will be processed by the communication subsystem 1011 and input to the processor 1038, which may further process the received signal for output to the display 1022, or alternatively to an auxiliary I/O device 1028.

A user of mobile device 1000 may also compose data items such as messages for example, using the keyboard 1032, which may be a complete alphanumeric keyboard or telephone-type keypad, either physical or virtual, among others, in conjunction with the display 1022 and possibly an auxiliary I/O device 1028. Such composed items may then be transmitted over a communication network through the communication subsystem 1011.

Where voice communications are provided, overall operation of mobile device 1000 is similar, except that received signals may typically be output to a speaker 1034 and signals for transmission may be generated by a microphone 1036. Alternative voice or audio I/O subsystems, such as a voice message recording subsystem, may also be implemented on mobile device 1000. Although voice or audio signal output is preferably accomplished primarily through the speaker 1034, display 1022 may also be used to provide an indication of the identity of a calling party, the duration of a voice call, or other voice call related information for example.

Serial port 1030 in FIG. 10 may be implemented in a mobile device for which synchronization with a user's desktop computer (not shown) may be desirable, but is an optional device component. Such a port 1030 may enable a user to set preferences through an external device or software application and may extend the capabilities of mobile device 1000 by providing for information or software downloads to mobile device 1000 other than through a wireless communication network. As will be appreciated by those skilled in the art, serial port 1030 can further be used to connect the mobile device to a computer to act as a modem or for charging a battery on the mobile device.

Other communications subsystems 1040, such as a short-range communications subsystem, is a further component which may provide for communication between mobile device 1000 and different systems or devices, which need not necessarily be similar devices. For example, the subsystem 1040 may include an infrared device and associated circuits and components or a Bluetooth™ or Bluetooth™ Low Energy communication module to provide for communication with similarly enabled systems and devices. Subsystem 1040 may further include a WUR radio. Subsystem 1040 may further include a DSRC radio. Subsystem 1040 may further include non-cellular communications such as WiFi or WiMAX, or near field communications.

Mobile device 1000 may further includes a sensor subsystem 1060, providing processor 1038 with data from a variety of sensors on the mobile device. For example, in FIG. 10 sensors include accelerometer 1062, gyroscope 1064, GPS 1066, altimeter 1068, and other sensors 1070. Other sensors 1070 could be any sensor providing information to processor 1038 through sensor subsystem 1060.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method at a power-limited computing station for communicating in an intelligent transport system, the method comprising:

operating the computing station in one of a non-critical radio operating state and a safety-critical radio operating state, the safety-critical radio operating state having shorter sleep cycles to provide lower latency than the non-critical radio operating state for communications with one or more components of the intelligent transport system;

receiving a trigger at the computing station;

determining whether the trigger should cause the computing station to transition a radio operating state, wherein the determining ignores the trigger when the computing station is in a different plane from a transmitter that sent the trigger;

when the trigger should cause the computing station to transition the radio operating state, changing the radio operating state to the other of the non-critical radio operating state and the safety-critical radio operating state; and when the radio operating state is changed to the safety-critical radio operating state, transmitting a signal indicating that the radio operating state is the safety-critical radio operating state.

2. The method of claim 1, wherein the non-critical radio operating state consumes less power resources but has a higher response latency than the safety-critical radio operating state.

3. The method of claim 1, wherein the trigger includes at least one of a wake-up radio signal and a Bluetooth Low Energy signal received at the computing station.

4. The method of claim 1, wherein the trigger is relayed from a vehicle or other computing station in the intelligent transport system using an infrastructure element.

5. The method of claim 1, wherein the trigger includes one or more messages of the type of a Cooperative Awareness Message, a Personal Safety Message, or a Basic Safety message.

6. The method of claim 1, wherein the changing to the safety-critical radio operating state causes a second radio to be activated on the computing station.

7. The method of claim 6, wherein the second radio is a safety radio for intelligent transportation systems.

8. The method of claim 1, wherein the changing to the non-critical radio operating state causes a radio on the computing station to use discontinuous reception.

9. The method of claim 1, wherein the determining uses information from local sensors on the computing station in conjunction with the trigger.

10. The method of claim 1, wherein the trigger is a message from a cellular base station providing an indication that the computing station is entering or leaving a geofenced area.

11. The method of claim 1, wherein the determining differs based on time of day.

12. A power-limited computing station for communicating in an intelligent transport system, the computing station comprising:
a processor; and
a communications subsystem,
wherein the computing station is configured to:
operate in one of a non-critical radio operating state and a safety-critical radio operating state, the safety-critical radio operating state having shorter sleep cycles to provide lower latency than the non-critical radio operating state for communications with one or more components of the intelligent transport system;
receive a trigger at the computing station;
determine whether the trigger should cause the computing station to transition a radio operating state, wherein the determining ignores the trigger when the computing station is in a different plane from a transmitter that sent the trigger;
when the trigger should cause the computing station to transition the radio operating state, change the radio operating state to the other of the non-critical radio operating state and the safety-critical radio operating state; and
when the radio operating state is changed to the safety-critical radio operating state, transmit a signal indicating that the radio operating state is the safety-critical radio operating state.

13. The computing station of claim 12, wherein the non-critical radio operating state consumes less power resources but has a higher response latency than the safety-critical radio operating state.

14. The computing station of claim 12, wherein the trigger includes at least one of a wake-up radio signal and a Bluetooth Low Energy signal received at the computing station.

15. The computing station of claim 12, wherein the trigger is relayed from a vehicle or other computing station in the intelligent transport system using an infrastructure element.

16. The computing station of claim 12, wherein the trigger includes one or more messages of the type of a Cooperative Awareness Message, a Personal Safety Message, or a Basic Safety message.

17. The computing station of claim 12, wherein the computing station is configured to change to the safety-critical radio operating state by causing a second radio to be activated on the computing station.

18. The computing station of claim 17, wherein the second radio is a safety radio for intelligent transportation systems.

19. The computing station of claim 12, wherein the computing station is configured to change to the non-critical radio operating state by causing a radio on the computing station to use discontinuous reception.

20. The computing station of claim 12, wherein the computing station is configured to determine using information from local sensors on the computing station in conjunction with the trigger.

21. The computing station of claim 12, wherein the trigger is a message from a cellular base station providing an indication that the computing station is entering or leaving a geofenced area.

22. The computing station of claim 12, wherein the computing station is configured to determine based on time of day.

23. A non-transitory computer readable medium containing instruction code, which, when executed by a processor of computing station, allow for communication in an intelligent transport system, the instruction code causing the computing station to:
operate in one of a non-critical radio operating state and a safety-critical radio operating state, the safety-critical radio operating state having shorter sleep cycles to provide lower latency than the non-critical radio operating state for communications with one or more components of the intelligent transport system;
receive a trigger at the computing station;
determine whether the trigger should cause the computing station to transition a radio operating state, wherein the determining ignores the trigger when the computing station is in a different plane from a transmitter that sent the trigger;
when the trigger should cause the computing station to transition the radio operating state, change the radio operating state to the other of the non-critical radio operating state and the safety-critical radio operating state; and
when the radio operating state is changed to the safety-critical radio operating state, transmit a signal indicating that the radio operating state is the safety-critical radio operating state.

* * * * *